US012619077B2

(12) United States Patent
Lin et al.

(10) Patent No.: US 12,619,077 B2
(45) Date of Patent: May 5, 2026

(54) COMPACT HEAD-UP DISPLAY AND WAVEGUIDE THEREFOR

(71) Applicant: Envisics Ltd, Milton Keynes (GB)

(72) Inventors: Ruisheng Lin, Milton Keynes (GB); Timothy Smeeton, Milton Keynes (GB); Yiren Xia, Milton Keynes (GB); Jamieson Christmas, Milton Keynes (GB)

(73) Assignee: Envisics Ltd., Milton Keynes (GB)

( * ) Notice: Subject to any disclaimer, the term of this patent is extended or adjusted under 35 U.S.C. 154(b) by 552 days.

(21) Appl. No.: 18/062,141

(22) Filed: Dec. 6, 2022

(65) Prior Publication Data

US 2023/0194874 A1 Jun. 22, 2023

(30) Foreign Application Priority Data

Dec. 21, 2021 (GB) ...................................... 2118613

(51) Int. Cl.
*G02B 27/01* (2006.01)
*G02B 27/00* (2006.01)

(52) U.S. Cl.
CPC ..... *G02B 27/0172* (2013.01); *G02B 27/0081* (2013.01); *G02B 2027/0125* (2013.01)

(58) Field of Classification Search
CPC ............ G02B 27/0172; G02B 27/0081; G02B 2027/0125; G02B 27/106; G02B 27/1086; G02B 27/0103; G02B 27/0101
See application file for complete search history.

(56) References Cited

U.S. PATENT DOCUMENTS

| | | | |
|---|---|---|---|
| 10,571,699 B1 * | 2/2020 | Parsons | G02B 6/0028 |
| 11,181,815 B1 * | 11/2021 | Wheelwright | G02B 27/0093 |
| 2009/0015929 A1 | 1/2009 | DeJong et al. | |

(Continued)

FOREIGN PATENT DOCUMENTS

| | | |
|---|---|---|
| WO | WO 2014/009717 A1 | 1/2014 |
| WO | 2019/157986 A1 | 8/2019 |

(Continued)

OTHER PUBLICATIONS

Search Report issued in GB 2118613.5 on May 17, 2022 (4 pages).
Extended European Search Report issued in EP 22 213 036.1 on May 25, 2023 (10 pages).

*Primary Examiner* — Ricky L Mack
*Assistant Examiner* — Natasha Nigam
(74) *Attorney, Agent, or Firm* — Akerman LLP

(57) ABSTRACT

A display system comprises a waveguide forming a pupil expander. The waveguide comprises a pair of opposing surfaces arranged to guide a diffracted light field therebetween by internal reflection. An input port of the waveguide is arranged to receive light from a display system. An output port of the waveguide is formed by a first transmissive-reflective element of a first surface of the pair of opposing surfaces. The first transmissive-reflective element is such that the diffracted light field is divided at each internal reflection and a plurality of replicas of the diffracted light field are transmitted out of the waveguide through the output port. The input port comprises a second transmissive-reflection element arranged to receive at least a portion of the light from the display system.

20 Claims, 9 Drawing Sheets

(56)            References Cited

U.S. PATENT DOCUMENTS

| 2010/0321781 | A1 |   | 12/2010 | Levola et al. | |
|---|---|---|---|---|---|
| 2017/0031161 | A1 | * | 2/2017 | Rossini | G02B 27/0101 |
| 2020/0049872 | A1 | * | 2/2020 | Peng | G02B 27/283 |
| 2022/0057643 | A1 | * | 2/2022 | Eisenfeld | G02B 27/0172 |
| 2022/0345220 | A1 | * | 10/2022 | Shi | H01S 3/1083 |

FOREIGN PATENT DOCUMENTS

| WO | 2021/053665 | A1 | 3/2021 |
|---|---|---|---|
| WO | 2021/110746 | A1 | 6/2021 |

\* cited by examiner

COMPACT HEAD-UP DISPLAY AND WAVEGUIDE THEREFOR

CROSS-REFERENCE TO RELATED APPLICATIONS

This application claims priority under 35 U.S.C. § 119 to UK Patent Application GB 2118613.5, titled "Compact Head-Up Display and Waveguide Therefor," filed on Dec. 21, 2021, and currently pending. The entire contents of GB 2118613.5 are incorporated by reference herein for all purposes.

FIELD

The present disclosure relates to pupil expansion or replication, in particular, for a diffracted light field comprising diverging ray bundles. More specifically, the present disclosure relates a display system comprising a waveguide pupil expander and to a method of pupil expansion using a waveguide. Some embodiments relate to two-dimensional pupil expansion, using first and second waveguide pupil expanders. Some embodiments relate to a picture generating unit and a head-up display, for example an automotive head-up display (HUD).

INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other embodiments, the image is a real image formed by holographic reconstruction and the image is projected or relayed to the viewing plane. The image is formed by illuminating a diffractive pattern (e.g., hologram) displayed on the display device.

The display device comprises pixels. The pixels of the display device may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCoS") spatial light modulator (SLM). Light propagates over a range of diffraction angles (for example, from zero to the maximum diffractive angle) from the LCoS, towards a viewing entity/system such as a camera or an eye. In some embodiments, magnification techniques may be used to increase the range of available diffraction angles beyond the conventional maximum diffraction angle of an LCoS.

In some examples, an image (formed from the displayed diffractive pattern/hologram) is propagated to the eyes. For example, spatially modulated light of an intermediate holographic reconstruction/image formed either in free space or on a screen or other light receiving surface between the display device and the viewer, may be propagated to the viewer.

In some other examples, the (light of a) diffractive pattern/hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-motion box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre, and the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels). Embodiments of the present disclosure relate to a configuration in which a hologram of an image is propagated to the human eye rather than the image itself. In other words, the light received by the viewer is modulated according to (or encoded with/by) a hologram of the image. However, other embodiments of the present disclosure may relate to configurations in which the image is propagated to the human eye rather than the hologram—for example, by so called indirect view, in which light of a holographic reconstruction or "replay image" formed on a screen (or even in free space) is propagated to the human eye.

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure relates to non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window—e.g., eye-box or eye motion box for viewing by the viewer. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

In some embodiments, the first pair of opposing surfaces of the waveguide are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of surfaces is arranged to cause the light to propagate within the first waveguide pupil expander, with the general direction of light propagation being in the direction along which the first waveguide pupil expander is relatively long (i.e., in its "elongate" direction).

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram or point cloud hologram. The use of diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field (e.g. diffracted light comprising diverging (not collimated) ray bundles).

In aspects, the display system comprises a display device—such as a pixelated display device, for example a spatial light modulator (SLM) or Liquid Crystal on Silicon (LCoS) SLM—which is arranged to provide or form the diffracted (e.g. diverging) light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted (e.g. diverging) light field may be said to have "a light field size", defined in a direction substantially orthogonal to a propagation direction of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field—including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated (e.g. rod shaped) and the second waveguide pupil expander may be substantially planar (e.g. rectangular-shaped). The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The hologram may be represented, such as displayed, on a display device such as a spatial light modulator. When displayed on an appropriate display device, the hologram may spatially modulate light transformable by a viewing system into the image. The channels formed by the diffractive structure (comprising the hologram) are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram may also be a point cloud hologram. The hologram is described herein as routing light into a plurality of hologram channels merely to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be arbitrarily divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels. However, in some arrangements, a plurality of spatially separated hologram channels is formed by intentionally leaving areas of the target image, from which the hologram is calculated, blank or empty (i.e., no image content is present).

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the (special type of) hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

Broadly, a system is disclosed herein that provides pupil expansion for an input light field, wherein the input light field is a diffracted or holographic light field comprising diverging ray bundles. As discussed above, pupil expansion (which may also be referred to as "image replication" or "replication" or "pupil replication") enables the size of the area at/from which a viewer can see an image (or, can receive light of a hologram, which the viewer's eye forms an image) to be increased, by creating one or more replicas of an input light ray (or ray bundle). The pupil expansion can be provided in one or more dimensions. For example, two-dimensional pupil expansion can be provided, with each dimension being substantially orthogonal to the respective other.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffractive or diffracted light may be output by a display device such as a pixelated display device such as a spatial light modulator (SLM) arranged to display a diffractive structure such as a hologram. The diffracted light field may be defined by a "light cone". Thus, for a diverging light field, the size of the diffracted light field (as defined on a two-dimensional plane) increases with propagation distance from the corresponding diffractive structure (i.e. display device).

The spatial light modulator may be arranged to display a hologram (or a diffractive pattern comprising a hologram). The diffracted or diverging light may comprise light encoded with/by the hologram, as opposed to being light of an image or of a holographic reconstruction. In such embodiments, it can therefore be said that the pupil expander replicates the hologram or forms at least one replica of the hologram, to convey that the light delivered to the viewer is spatially modulated in accordance with a hologram of an image, not the image itself. That is, a diffracted light field is propagated to the viewer.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

In the present disclosure, the term "replica" is merely used to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with/by the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer (e.g. from a display device to a viewing system). The diffracted light field may form an image.

The optical system comprises a waveguide, for example a waveguide pupil expander as described herein. The waveguide comprises an input port, and output port and a pair of opposing surfaces. The pair of opposing surfaces is arranged to guide a diffracted light field therebetween by internal reflection. The input port is arranged to receive light from a display system. The output port is formed by a first transmissive-reflective element of a first surface of the pair of opposing surfaces. The first transmissive-reflective element is such that the diffracted light field is divided at each internal reflection and a plurality of replicas of the diffracted light field are transmitted out of the waveguide through the output port. The input port comprises a second transmissive-reflection element arranged to receive, and partially transmit and partially reflect, at least a portion of the light from the display system.

In a conventional waveguide arranged to guide a diffractive light field by internal reflection, the input port typically comprises an optically transparent entrance window or opening, and the waveguide is orientated so that propagation axis of the diffractive light field is incident on the input port at the desired angle. Such an arrangement avoids the need for an input coupler at the input port to couple light into the waveguide at the desired angle. For example, a conventional input coupler may comprise a grating structure that is specifically configured to diffract incident collimated light of a specific wavelength at a desired angle into a waveguide to provide phase matching and efficient in-coupling of the light. However, such an input coupler is generally undesirable for the input of a diffractive light field, in which the ray bundles are diverging. Furthermore, the skilled person would recognise that additional diffraction of a diffractive light field received from a display system by a grating coupler may undesirably alter the diffractive light field and thus the adversely affect the quality of the image.

Accordingly, in contrast to a conventional waveguide, the input port of the waveguide disclosed herein is formed at least partly from a transmissive-reflective element. That is, at least part of the surface of the waveguide that forms the input port is partly transmissive and partly reflective of light. Thus, the transmissive-reflective element of the input port is arranged to receive, and partially transmit and partially reflect, at least a portion of the light from the display system. This is counter-intuitive, as it reduces the optical efficiency of coupling of the received light rays into the waveguide, by partially reflecting a proportion of the light incident on the transmissive-reflective element and so preventing in-coupling thereof. Nevertheless, as described herein, this enables in-coupling and trapping (referred to herein as "proper" or "full" coupling) of all rays of a divergent ray bundle incident on the input port, albeit at the expense of lower optical efficiency due to reduced coupling efficiency of received light and with the possibility of loss of some light back through the input port after one reflection from the opposing surface of the waveguide. Thus, in implementations comprising a plurality of angular channels of the diffracted light field, this allows light representing all the different angular components to be coupled in, and then trapped inside, the waveguide, at the cost of lower optical efficiency. Moreover, there is no limit on the size of the ray bundle (such as the maximum diffraction angle corresponding to the cone angle) that can be coupled into the waveguide. Rather, it is possible to retain all light ray angles of a diffractive light field.

In embodiments, the second transmissive-reflective element is arranged to internally reflect, within the waveguide, at least some of the diffracted light field. In some examples, the second transmissive-reflective element is configured such that at least some of the diffracted light field is incident thereon only once. In one example, the second transmissive-reflective element is configured such that all light rays of the diffracted light field are incident thereon only once.

The input port may be formed on a second surface of the pair of opposing surfaces. The waveguide may further comprise a reflective element arranged to internally reflect within the waveguide the diffracted light field. The reflective element may be disposed on the second surface immediately adjacent the input port. In some examples, the transmissivity of the second surface from the start of the second transmissive-reflective element to the end of the reflective element is continuous, for example continuously decreasing.

The second transmissive-reflective element may comprise a surface coating or layer that is partially reflective and partially transmissive. The surface coating may cover at least a part of the area of the input port (i.e. a "section" of the input port). For example, the surface coating may extend over a part of the length of the input port in the direction of waveguiding. The term "coating" is used to merely to indicate that the element covers a section or area of the input port and is not intended to refer to the manner by which the element is formed or manufactured. Accordingly, in some examples of a surface coating, the second transmissive-reflective element may be a partially-reflective-partially transmissive component or facet that is overlaid to cover a part of the area of the input port. In other examples of a surface coating, second transmissive-reflective element may be one or more layers of partially reflective and partially transmissive material that are formed over, and thus cover, a part of the area of the input port on a surface of the waveguide. The second transmissive-reflective element (e.g. surface coating) may be substantially planar.

In examples described herein, the area or section of the input port comprising the second transmissive-reflective element is continuous along the length thereof (i.e. in the direction of waveguiding). It may be said that the second transmissive-reflective element is uniform in the sense that it uniformly covers a continuous section of the input port. Nevertheless, in some examples, the reflectivity-transmissivity of the element may be graded, and thus variable, across the continuous section, such as graded in the direction along the length of the input port. In some examples, the grading is achieved using a series of stacked thin film layers. As a result, the thickness of the second transmissive element is substantially uniform, but may nevertheless have small variations due to different numbers of thin film layers at different positions along the direction of grading.

In some implementations, the second transmissive-reflective element is arranged to receive all the light from the display system. In other implementations, the input port further comprises a transmissive element or region arranged to receive a portion of the light from the display system. The transmissive element may adjoin the second transmissive-reflective element and/or the second transmissive-reflective element may adjoin the reflective element.

In implementations of the waveguide, the display system comprises a spatial light modulator arranged to display a hologram and/or the diffracted light field is spatially modulated in accordance with the hologram. In some examples, the display system comprises a display device having a pixel area defining the exit pupil of the display system that is expanded by the waveguide.

There is further provided a system, such as a display system or a projection system, comprising the waveguide. The waveguide is second one-dimensional pupil expander of a pair of waveguide pupil expanders arranged to expand the pupil of the system in a first direction and second, perpendicular direction, respectively.

In some embodiments, the diffracted light field comprises diverging ray bundles. Reference is made herein to a diffracted light field with respect to a diverging light ray bundle comprising light rays having a plurality of different light ray angles. Whilst embodiments describe a diverging light ray bundle, the person skilled in the art will appreciate that the same fundamental principles could be applied to the propagation of a converging light ray bundle. Therefore, more generally, the present disclosure relates to a waveguide arranged to guide a "non-collimated" or "uncollimated" light field or light ray bundle. Nevertheless, in the embodiments described, the size or extent of the diverging light ray bundle may be characterized by a maximum and minimum light ray angle relative to the optical/projection axis or e.g. relative to the normal of the light receiving surface of the waveguide or a display device. In some embodiments, the diffracted light field is formed by a display device comprising pixels. In some embodiments, the diffracted light field is encoded with or spatially modulated in accordance with a hologram displayed on the display device. In some embodiments, the diffracted light field propagates from an image of the display device formed inside or outside the waveguide. In some embodiments, but not all, the light received by the input port is the diffracted light field. In some embodiments, the image formed by the diffracted light field is a virtual image.

The present disclosure refers to various "elements" of the waveguide with reference to their optical transmissivity and/or reflectivity. In some embodiments, each element is a section of one of the surfaces of the waveguide that extends in the direction of waveguiding. Thus, the term "section" refers to a continuous (i.e. uninterrupted) area that forms part of the respective surface of the waveguide. Typically, the surfaces of the waveguide are substantially planar and so a section of a surface is also substantially planar. The direction of waveguiding is the direction in which the light field is generally directed by the waveguide—despite the fact that the light is actually bouncing back and forth between two surfaces. In embodiments, the direction of waveguiding is also a direction of pupil expansion of the display system and/or the direction in which the replicas of the diffracted light field are output through the output port. Each element is configured to receive light and transmit and/or reflect the light as described. Some elements in some embodiments receive the light a plurality of times—for example, at a plurality of different points along their length in the direction of waveguiding. In some embodiments, different elements are adjoining (in the direction of waveguiding) and an optical characteristic, such as reflectivity, of the adjoining elements may be "continuous". The term "continuous" is used to indicate that there is no step change or discontinuity in the optical characteristic across the border between the adjoining elements. In some embodiments, the continuous nature of optical characteristic across the border between the adjoining elements makes the elements indistinguishable by that optical characteristic. However, the elements may still be distinguished by the other functions they perform. In embodiments, the term "transmissive" means substantially fully transmissive to the light received for waveguiding, such as T>0.9. In embodiments, the term "reflective" means substantially fully reflective to the light such as R>0.9. In embodiments, the term "transmissive-reflective" or "transflective" or "partially transmissive-reflective" means having both a material or non-zero transmissivity such as T>0.1 and a material or non-zero reflectivity such R>0.1.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
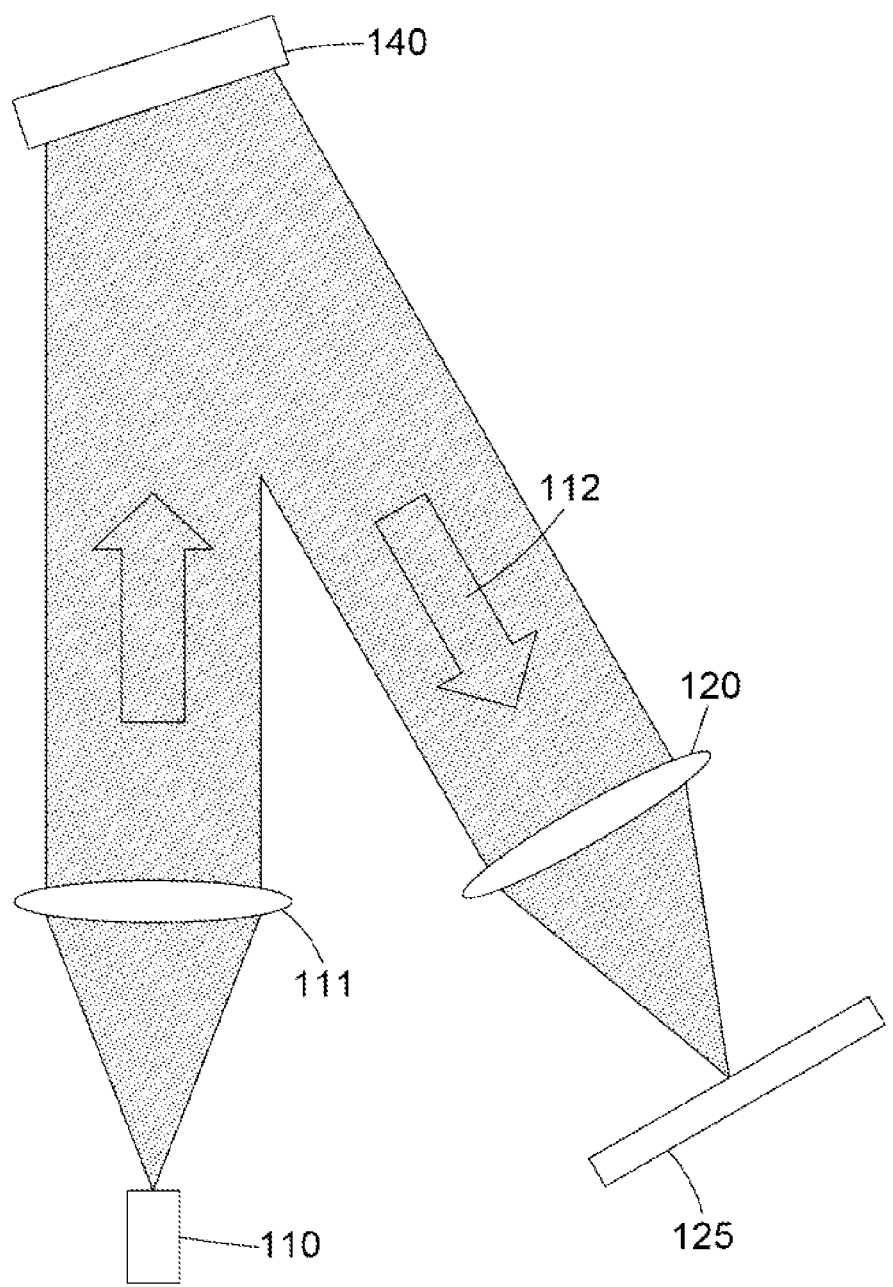
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Algorithms for generating a Fourier hologram of an image (using image data representing the image), such as Gerchberg-Saxton type algorithms, are well known in the art and so are not described in detail herein. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods. British patent application GB 2112213.0 filed 26 Aug. 2021, incorporated herein by reference, discloses example hologram calculation methods that may be combined with the present disclosure. In particular, the earlier patent application describes methods for calculating a type of hologram, described below with reference to FIGS. 2 and 3, that angularly divides/channels the image content.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Light Modulation

The display system comprises a display device defining the exit pupil of the display system. In embodiments, the display device is a spatial light modulator. For example, the spatial light modulator may be a phase modulator. In some embodiments, the display device is a liquid crystal on silicon, "LCOS", spatial light modulator "SLM", as well known in the art. A LCOS SLM comprises a plurality of pixels, such as an array of quadrilateral shaped LC pixels. The pixels may be addressed or encoded with a diffractive pattern comprising a hologram. It may be said that the LCOS SLM is arranged "display" a hologram. The LCOS SLM is arranged to be illuminated with light, and to output spatially modulated light in accordance with the hologram. The spatially modulated light output by the LCOS SLM comprises a diffracted or holographic light field as described herein.

Light Channelling

The optical system disclosed herein is applicable to pupil expansion with any diffracted light field. In some embodiments, the diffracted light field is a holographic light field—that is, a complex light field that has been spatially modulated in accordance with a hologram of an image, not the image itself. In some embodiments, the hologram is a special type of hologram that angularly divides/channels the image content. This type of hologram is described further herein merely as an example of a diffracted light field that is compatible with the present disclosure. Other types of hologram may be used in conjunction with the display systems and light engines disclosed herein.

A display system and method are described herebelow, which comprise a waveguide pupil expander. As will be familiar to the skilled reader, the waveguide may be configured as a 'pupil expander' because it can be used to increase the area over (or, within) which the light emitted by a relatively small light emitter—such as a relatively small SLM or other pixelated display device as used in the arrangements described herein—can be viewed by a human viewer or other viewing system that is located at a distance, such as a relatively large distance, away from the light emitter. The waveguide achieves this by increasing the number of transmission points from which the light is output, towards the viewer. As a result, the light may be seen from a plurality of different viewer locations and, for example, the viewer may be able to move their head, and therefore their line of sight, whilst still being able to see the light from the light emitter. Thus, it can be said that the viewer's 'eye-box' or 'eye-motion box' is enlarged, through use of a waveguide pupil expander. This has many useful applications, for example but not limited to head-up displays, for example but not limited to automotive head-up displays.

A display system as described herein may be configured to guide light, such as a diffracted light field, through a waveguide pupil expander in order to provide pupil expansion in at least one dimension, for example in two dimensions. The diffracted light field may comprise light output by a spatial light modulator (SLM), such as an LCOS SLM. For example, that diffracted light field may comprise light that is encoded by a hologram displayed by the SLM. For example, that diffracted light field may comprise light of a holographically reconstructed image, corresponding to a hologram displayed by the SLM. The hologram may comprise a computer-generated hologram (CGH) such as, but not limited to, a point-cloud hologram, a Fresnel hologram, or a Fourier hologram. The hologram may be referred to as being a 'diffractive structure' or a 'modulation pattern'. The SLM or other display device may be arranged to display a diffractive pattern (or, modulation pattern) that comprises the hologram and one or more other elements such as a software lens or diffraction grating, in a manner that will be familiar to the skilled reader.

The hologram may be calculated to provide channelling of the diffracted light field. This is described in detail in each of GB2101666.2, GB2101667.0, and GB2112213.0, all of which are incorporated by reference herein. In general terms, the hologram may be calculated to correspond to an image that is to be holographically reconstructed. That image, to which the hologram corresponds, may be referred to as an 'input image' or a 'target image'. The hologram may be calculated so that, when it is displayed on an SLM and suitably illuminated, it forms a light field (output by the SLM) that comprises a cone of spatially modulated light. In some embodiments the cone comprises a plurality of continuous light channels of spatially modulated light that correspond with respective continuous regions of the image. However, the present disclosure is not limited to a hologram of this type.

Although we refer to a 'hologram' or to a 'computer-generated hologram (CGH)' herein, it will be appreciated that an SLM may be configured to dynamically display a plurality of different holograms in succession or according to a sequence. The systems and methods described herein are applicable to the dynamic display of a plurality of different holograms.

Figure 2:
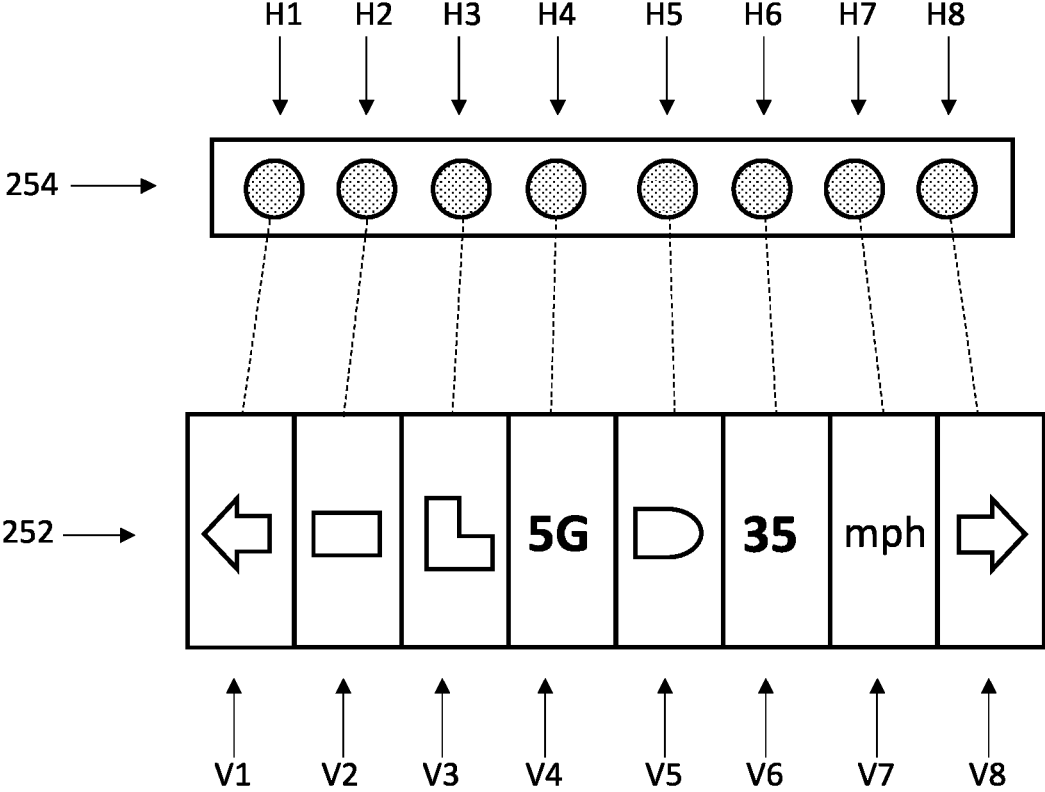
FIG. 2 shows an image comprising a plurality of image areas (bottom) and corresponding hologram comprising a plurality of hologram components (top)
Figure 3:
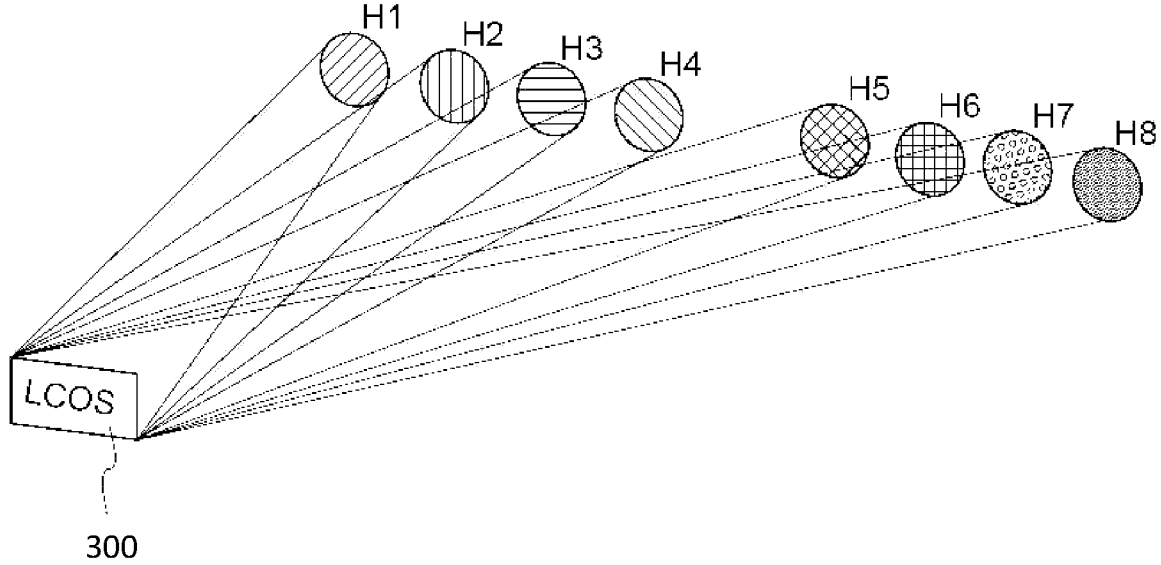
FIG. 3 shows a hologram characterised by the routing or channelling of holographically encoded light into a plurality of discrete hologram channels.

FIGS. 2 and 3 show an example of a type of hologram that may be displayed on a display device such as an SLM, which can be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channelling of light that it performs. This is illustrated in FIG. 3. Specifically, the hologram in this example directs light into a plurality of discrete areas. The discrete areas are discs in the example shown but other shapes are envisaged. The size and shape of the optimum disc may, after propagation through the waveguide, be related to the size and shape of the entrance pupil of the viewing system.

Figure 4:
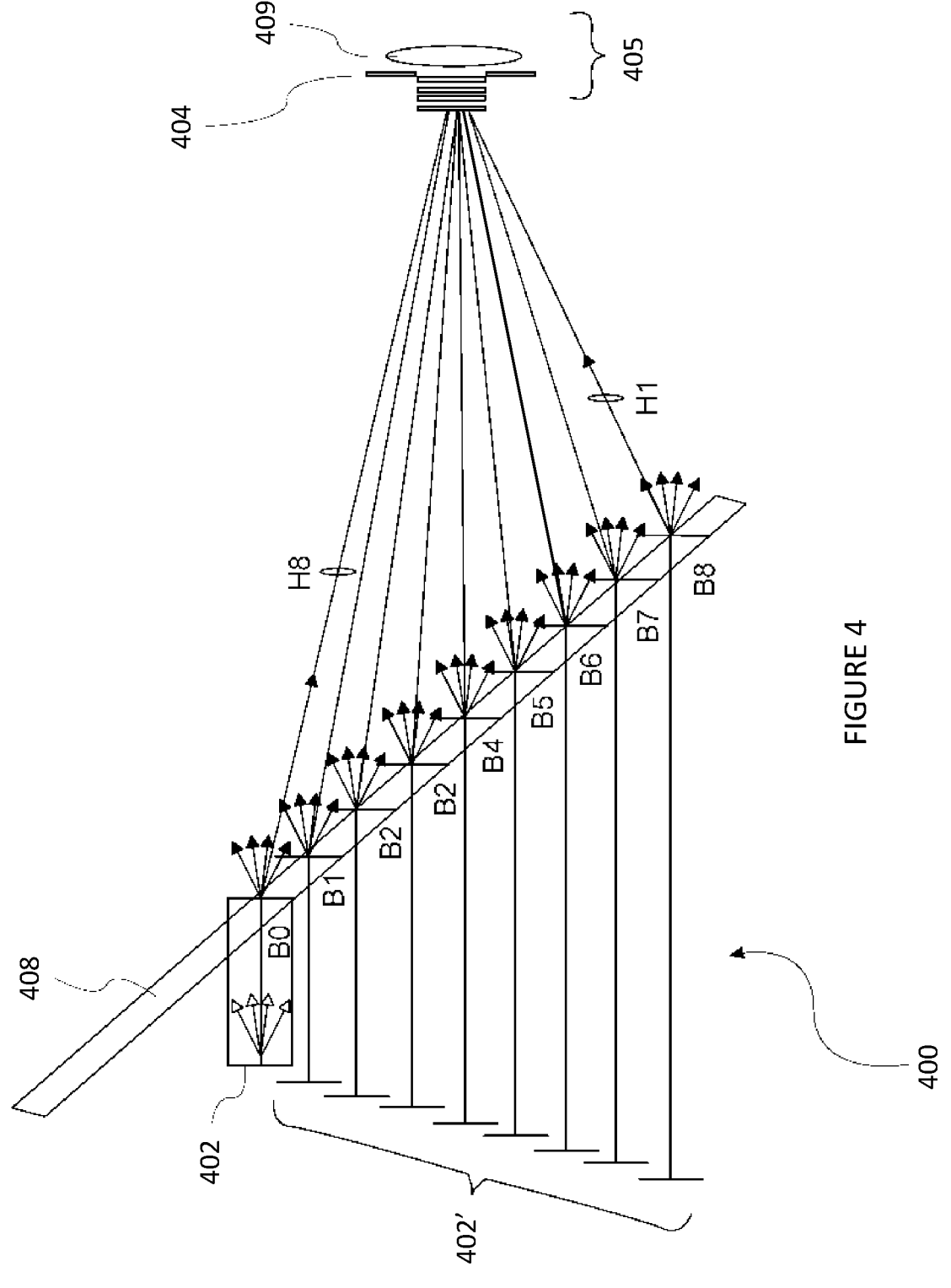
FIG. 4 shows a system arranged to route the light content of each hologram channel of FIG. 3 through a different optical path to the eye.

FIG. 4 shows a system 400, including a display device that displays a hologram that has been calculated as illustrated in FIGS. 2 and 3.

The system 400 comprises a display device, which in this arrangement comprises an LCOS SLM 402 (which may be simply referred to as LCOS 402). The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 508 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its second planar surface (located nearest the LCOS 402) and is guided at least partially along the length of the waveguide 408, before being emitted via its first planar surface, substantially opposite the second surface (located nearest the eye). As will be well understood, the first planar surface is partially reflective, partially transmissive. In other words, when each ray of light travels within the waveguide 408 from the second planar surface and hits the first planar surface, some of the light will be transmitted out of the waveguide 408 and some will be reflected by the first planar surface, back towards the second planar surface. The second planar surface is (highly) reflective, such that all light that hits it, from within the waveguide 408, will be reflected back towards the first planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG. 2 is transmitted out of the waveguide at each "bounce" from the first planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

The waveguide 408 forms a plurality of replicas of the hologram, at the respective "bounce" points B1 to B8 along its length, corresponding to the direction of pupil expansion. As shown in FIG. 4, the plurality of replicas may be extrapolated back, in a straight line, to a corresponding plurality of replica or virtual display devices 402'. This process corresponds to the step of "unfolding" an optical path within the waveguide, so that a light ray of a replica is extrapolated back to a "virtual surface" without internal reflection within the waveguide. Thus, the light of the expanded exit pupil may be considered to originate from a virtual surface (also called an "extended modulator" herein) comprising the display device 402 and the replica display devices 402'.

The methods and arrangements described above can be implemented in a variety of different applications and viewing systems. For example, they may be implemented in a head-up-display (HUD) or in a head or helmet mounted device (HMD) such as an Augmented Reality (AR) HMD.

In some embodiments, the image perceived by a viewer or viewing system (e.g. camera) is a virtual image. That is, an image that appears/forms upstream of (i.e. behind) the display device. However, the present disclosure is equally applicable to the formation of real images or simultaneous formation of a virtual image and real image using the same hologram.

Likewise, some embodiments describe waveguiding and replication of a hologram but the present disclosure is equally applicable to waveguiding and replication of an image, optionally, an image formed by a hologram.

Two-Dimensional Pupil Expansion

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to different angular content and/or different portion of an image, the present disclosure and the systems that are described herebelow are not limited to such a hologram type.

Figure 5:
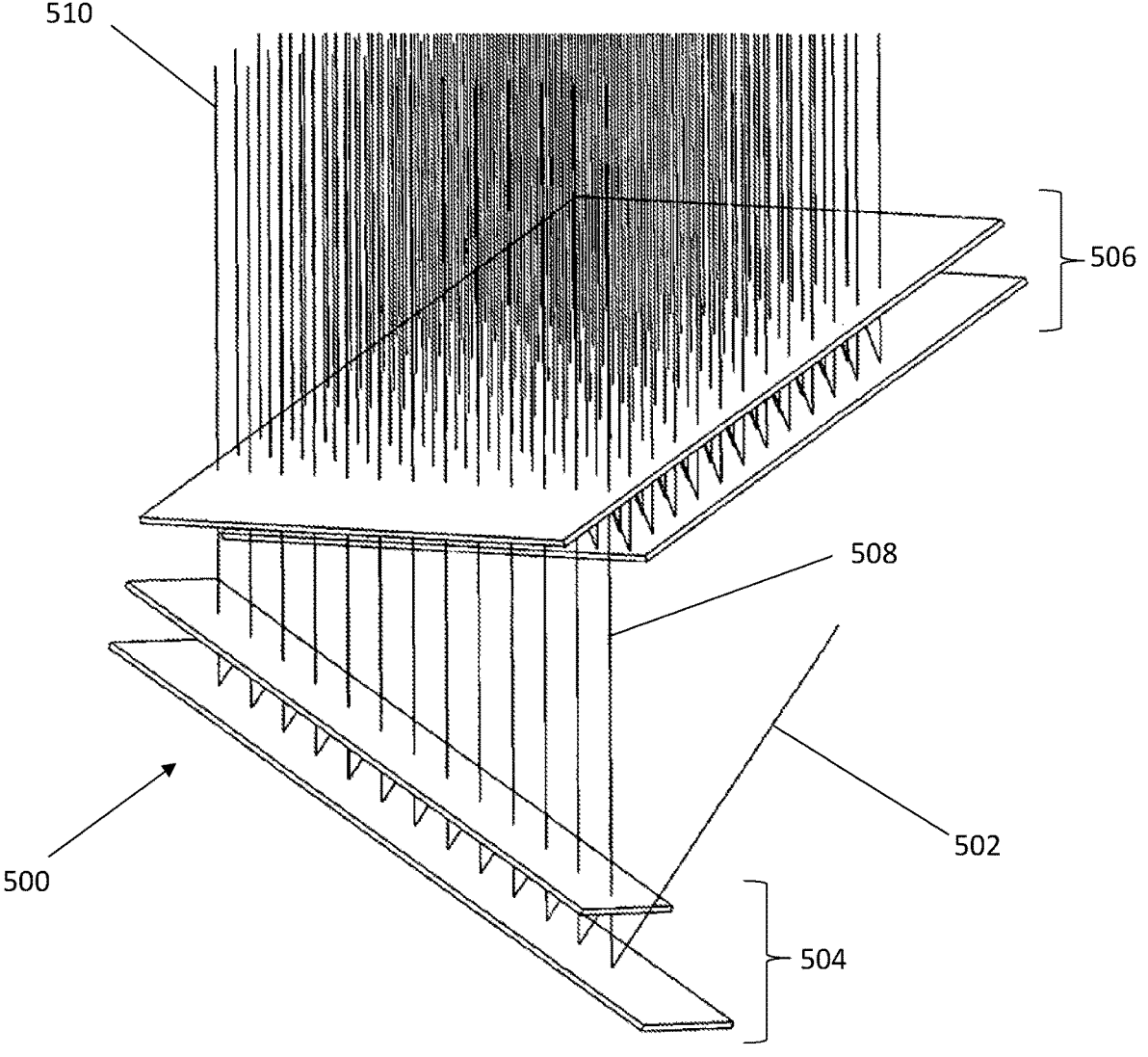
FIG. 5 shows a perspective view of a pair of stacked image replicators arranged for expanding a beam in two dimensions.

FIG. 5 shows a perspective view of a system 500 comprising two replicators, 504, 506, arranged for expanding a light beam 502 in two dimensions.

In the system 500 of FIG. 5, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are substantially elongate in one direction. The collimated light beam 502 is directed towards an input on the first replicator 504. Due to a process of internal reflection between the two surfaces, and partial transmission of light from each of a plurality of output points on one of the surfaces (the upper surface, as shown in FIG. 5), which will be familiar to the skilled reader, light of the light beam 502 is replicated in a first direction, along the length of the first replicator 504.

Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5 combine to provide a two-dimensional replicator (or, "two-dimensional pupil expander"). Each of the first and second replicators 504, 505 takes the form of a waveguide pupil expander comprising a pair of opposing surfaces arranged to guide light therebetween by internal reflection, as described herein. The waveguides shown in FIG. 5 each comprise a pair of first and second opposing surfaces arranged substantially parallel to, and spatially separated from, each other (e.g. by air). In other arrangements, the waveguides may comprise so-called "slab waveguides", in which the first and second opposing surfaces are the opposing (major) parallel surfaces of a slab of optically transparent solid material. In this case, the first replicator 504 may comprise an elongate, rod-shaped slab for providing ID pupil expansion in a first direction along the length of the rod, and the second replicator may comprise a planar, rectangular-shaped slab for providing pupil expansion in a second direction orthogonal to the first direction.

Coupling a Diffracted Light Field into a Waveguide

Figure 6:
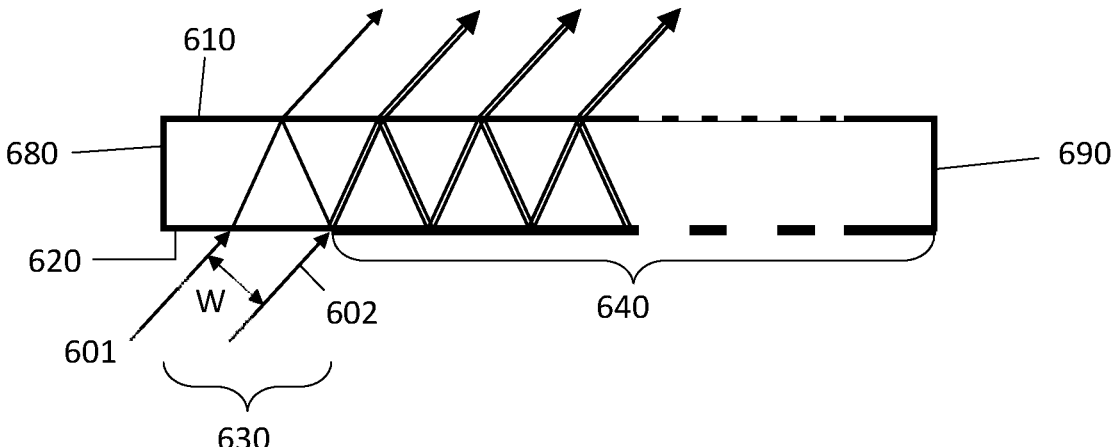
FIG. 6 shows the optimal or ideal coupling of light rays of a collimated light beam into a waveguide through an input port comprising an optically transparent window.

FIG. 6 is a schematic ray diagram showing the optimal or ideal coupling of a beam of collimated light into a conventional waveguide through an input port comprising a transparent window.

In particular, the illustrated waveguide comprises a pair of opposing surfaces 610, 620 arranged to guide light therebetween in a direction along its length of the waveguide, as shown by the two example light rays representative of a light ray bundle comprising many more light rays. In particular, the two example light rays are located at the extreme positions of the light ray bundle (i.e. at opposite "edges" of light beam—described herein as "front edges" and "back edges"). In particular, the light rays undergo a series of internal reflections or "bounces" between the pair of opposing surfaces 610, 620. A first surface 610 of the pair of opposing surfaces comprises a first transmissive-reflective element (e.g. surface comprising a partially reflective-partially transmissive coating) that forms an output port of the waveguide. Thus, as shown in FIG. 6, a series of replicas of both example light rays is formed, by virtue of the division of light by the first transmissive-reflective element at each internal reflection or "bounce" of light rays at the first surface 610. These replicas are transmitted through the output port of the waveguide as shown by arrows. A second surface 620 of the pair of opposing surfaces comprises a reflective element (e.g. surface comprising a (highly) reflective coating) having a transparent window 630 therein forming an input port. In the illustrated arrangement, the transparent window 630 is adjacent a first end 680 of the waveguide such that light is guided from the input port in a direction towards a second end 690 of the waveguide.

For optimal or ideal coupling of a light beam of width W, comprising a bundle of light rays of the beam that are parallel to each other as shown in FIG. 6, the light rays at the front edges of the bundle of rays of the light beam (i.e. furthest from the first end 680 of the waveguide or furthest to the right in the drawing) are aligned with the corresponding edge of the transparent window 630 (i.e. the right hand edge in the drawing). The angle of incidence of the light beam is such that the light rays at the rear edges of the bundle of rays of the light beam (i.e. closest to the first end 680 of the waveguide or furthest to the left in the drawing) are coupled into, and trapped inside, the waveguide by the first "bounce" at first surface 610. Thus, all the light rays of the (collimated) beam are incident on second surface 620 at the same oblique angle, pass through the transparent window 630 and are fully coupled into the waveguide. In consequence, all the light rays of the beam are incident on the first transmissive-reflective element of the first surface 610 at the same oblique angle. Significantly, this results in a series of internal reflections or "bounces" of light rays, and the output of a corresponding series of replicas, that are parallel to each other as shown in FIG. 6. In consequence, there is no loss of light rays from the input (collimated) light beam and all content of the input beam is present in all the replicas of the expanded exit pupil at the output port.

However, in some applications, the bundle of light rays of a light beam may not be collimated such that all the light rays are not completely parallel to each other. For example, the beam may be divergent, such that the bundle of light rays takes the form of a cone of light in which the size of the diffracted light field (as defined on a two-dimensional plane) increases with propagation distance. In particular, in some applications, it is necessary for the light beam to be divergent in order that an image can be formed at a finite virtual image distance as opposed to in the far field—i.e. at infinity. Thus, and significantly, light rays propagate in different directions. As the skilled person will appreciate, in other applications the light beam may be convergent, and the teachings of the present disclosure are equally applicable to divergent and convergent light beams.

Figure 7:
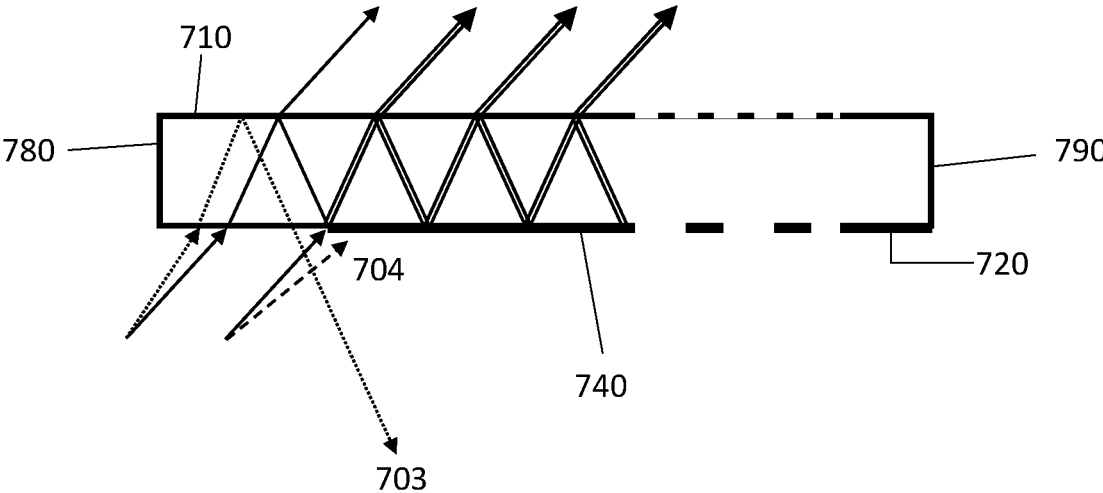
FIG. 7 shows the coupling of light rays of an uncollimated light beam into a waveguide through an input port comprising an optically transparent window.

FIG. 7 is a schematic ray diagram, similar to FIG. 6, showing the coupling of a divergent beam of light into a conventional waveguide through an input port comprising a transparent window. The light beam is aligned with the input port in the same way as the collimated light beam of FIG. 6.

Similar to the waveguide of FIG. 6, the waveguide of FIG. 7 comprises a pair of opposing surfaces 710, 720 arranged to guide light therebetween in a direction along its length, as shown by the illustrated example light rays, which are representative of a light ray bundle comprising many more light rays having different light ray angles. In particular, the light rays undergo a series of internal reflections or "bounces" between the pair of opposing surfaces 710, 720. A first surface 710 of the pair of opposing surfaces comprises a first transmissive-reflective element that forms an output port of the waveguide. As shown by arrows, a series of replicas is formed and transmitted through the output port, as described above with reference to FIG. 6. A second surface 720 of the pair of opposing surfaces comprises a reflective element having a transparent window therein forming an input port adjacent a first end 780 of the waveguide, as described above with reference to FIG. 6.

FIG. 7 shows two pairs of example light rays. In particular, a first pair of example light rays comprises a first example ray 703 at first angle—indicated by dotted line—and a second example ray at a second angle—indicated by solid line. A second pair of example light rays comprises a third example ray 704 at a third angle—indicated by dashed line—and a fourth example ray at a fourth angle—indicated by solid line.

Some of the light rays of the bundle of light rays of the beam are parallel to each other, as illustrated by the second and fourth rays of the first and second pairs of example light rays. These example/representative light rays are normal to the display device (not shown)—i.e. the second angle and the fourth angle is 0° (or parallel) relative to the surface normal of the display device—and may therefore be considered parallel to the propagation direction (or propagation axis) of the light ray bundle. These light rays are incident on second surface 720 at the same oblique angle, pass through the transparent window and are retained in the waveguide as per FIG. 6. Thus, the "parallel" light rays of the beam—corresponding to the second and fourth example light rays indicated by solid line—are incident on the first transmissive-reflective element of the first surface 710 at the same oblique angle. The fourth example ray of the second pair of example light rays of the light beam (i.e. furthest from the first end 780 of the waveguide or furthest to the right in the drawing) is aligned with the corresponding edge of the transparent window 630 as in FIG. 6. Thus, the second and fourth example rays are fully coupled into the waveguide, and guided between the pair of opposing surfaces 710, 720 parallel to each other, as shown by solid lines in FIG. 7.

However, some of the light rays of the bundle of light rays of the beam have different angles (i.e. have a direction that is non-parallel to the propagation direction or propagation axis of the bundle of light rays of the beam. Such rays are illustrated by the first and third example rays of the first and second pairs of example light rays, although it will be appreciated that many other light rays at a number of other light ray angles will be present in the bundle of light rays of the divergent beam. In particular, the first example ray 703 indicated by dotted line is at a first angle, and the third example ray 704 is at a third angle, where the first and third angles are different from each other and from the second/fourth angle.

As shown in FIG. 7, first example ray 703—indicated by dotted line—is incident on second surface 720 at a position near to the first end 780 of the waveguide (i.e. furthest to the left in the drawing). Thus, first example ray 703 passes through the transparent window into the waveguide and is incident on the first transmissive-reflective element of the first surface 710. However, first example ray 703—indicated by dotted line—is incident on the second surface 720 at a different oblique angle to the second (and fourth) example light rays—indicated by solid line. In particular, the first angle of first example light ray 703 is at the most extreme angle (largest angle to the surface normal of the display device/propagation direction or axis) at the rear edge of the divergent beam. Thus, since the first angle of the first example ray 703 is a non-zero angle to the surface normal of the display device/propagation axis of the beam, it has a smaller angle of incidence on the second surface 720 and a larger angle of incidence on the first surface 710 compared to the second example light ray—indicated by solid line. Thus, the first internal reflection or "bounce" of the first example light ray 703 at the first transmissive-reflective element of the first surface 710 is "steeper" than the equivalent internal reflection or "bounce" of the second and fourth example rays. In consequence, the first example light ray 703 is reflected back to a position at the transparent window of the second surface 720 and is transmitted out of the waveguide through the transparent window, as shown by the arrow. Thus, first example light ray 703 is not properly coupled into the waveguide but is lost.

Third example light ray 704 is incident on second surface 720 at a position at the front edge of the transparent window (furthest away the first end 780 of the waveguide or furthest to the right of the drawing). The third angle of third example light ray 704 is at the most extreme angle (largest angle to the propagation direction/axis) at the front edge of the divergent beam such that is does not pass through the transparent window into the waveguide. Thus, third example light ray 704 is likewise not properly coupled into the waveguide but is lost.

As noted above, first and third example rays 703, 704 have light ray angles corresponding to opposite, extreme positions of the light ray bundle of the divergent beam, comprising many other light rays at different light ray angles. Thus, first and third example rays 703, 704 are just two examples of light rays of the divergent beam that may be lost.

Accordingly, FIG. 7 shows that the coupling a divergent light beam into a conventional waveguide, through an input port comprising a transparent window, results in poor image quality since some light rays (e.g. at the edges) of the bundle of light rays of the input light beam are lost. Thus, content carried by the lost rays of the light beam may not be coupled into, and propagated through, the waveguide to form replicas. In consequence, the lost content may not be visible at corresponding positions of the eye-box. A significant drop in image quality is observed as a consequence of this issue because not all the image content is delivered to all eye-box positions.

The above problem of lost rays is particularly problematic in relation to the coupling of a diffracted light field (i.e. "light of a hologram" or a "light signal carrying a hologram" as described herein) into a waveguide, for example in a holographic projection system. In particular, in certain applications as mentioned above, the diffracted light field may be diverging (or converging). Thus, some of the light rays—in particular at the edges of a divergent beam—may be lost, leading to the loss of the associated image content from the beam coupled into the waveguide.

Moreover, in implementations comprising a hologram that angularly divides/channels the image content as described above, these light rays may form (at least part of) an individual hologram channel comprising angular content that corresponds to a respective portion of the image to be viewed. In consequence, the light output from the output port of the waveguide (i.e. replicas) may not contain all of the hologram channels, corresponding to portions of image content, so as to enable a viewing system to holographically reconstruct the complete target image. In particular, as the skilled person will appreciate, each "replica" formed by the waveguide must contain a light ray from all light ray angles—corresponding to the angular components/hologram channels—in order for a viewing system to faithfully reconstruct the image at the corresponding eye-box position.

The loss of some of the light rays means that at least some of the replicas do not contain a light ray at one or more of the required light ray angles. In summary, the loss of light rays may lead to the total loss of a part of the image content, which will leave gaps in the image that is perceived by a viewer.

These gaps in the image content may be described as "dark bands" at certain positions within the eye-box.

Having recognised this problem, the inventor proposes to replace the optically transparent window forming the input port of the waveguide with an entrance aperture that is partially reflective and partially transmissive, at least in part of its area. As described below, this ensures that all light rays of the bundle of light rays of a light beam incident on the entrance aperture are fully or properly coupled into the waveguide. Accordingly, when the light beam comprises a diffracted light field or hologram, this ensures that all the image content encoded by the hologram is properly coupled through the input port into the waveguide and so output from the expanded exit pupil for viewing. Thus, the light ray coupling efficiency of the waveguide is optimised. It will be appreciated that the optimisation in "light ray coupling efficiency" is at the expense of reduced "optical efficiency" of the waveguide, due to the loss of intensity of light due to reflection at the entrance aperture. Accordingly, some embodiments include mitigations to address the loss of intensity of the light coupled into the waveguide by increasing the optical power of the light beam emitted by the light source or, in the case of a pulsed light beam, additionally or alternatively the duration of the light pulse.

Partially-Reflective Entrance Aperture

Figure 8:
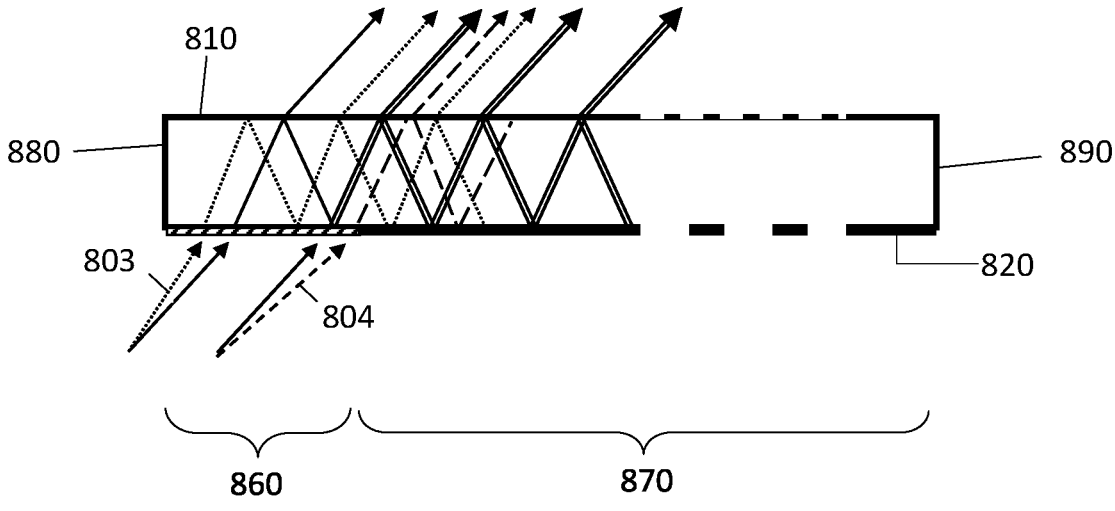
FIG. 8 shows the coupling of light rays of a diffracted light field into a waveguide comprising an input port in accordance with a first embodiment of the present disclosure.

FIG. 8 is a schematic ray diagram, showing the coupling of a divergent beam of light into a waveguide having an input port (or "entrance aperture") comprising a transmissive-reflective element in accordance with a first embodiment. In this arrangement, the light beam is incident on the input port in a similar configuration to the light beams of FIGS. 6 and 7. However, the input port is extended (or conversely the reflective element is displaced) so that the light rays at the front edge of the bundle of light rays of the diverging light beam (i.e. furthest from the first end 880 of the waveguide or furthest to the right in the drawings) are incident thereon.

Similar to the waveguides of FIGS. 6 and 7, the waveguide of FIG. 8 comprises a pair of opposing surfaces 810, 820 arranged to guide light therebetween in a direction along its length from a first end 880 to a second end 890, as shown by the example light rays. In particular, the light rays undergo a series of internal reflections or "bounces" between the pair of opposing surfaces 810, 820. A first surface 810 of the pair of opposing surfaces comprises a first transmissive-reflective element that forms an output port of the waveguide. As shown by arrows, a series of replicas is formed and transmitted through the output port, as described above with reference to FIG. 6. A second surface 820 of the pair of opposing surfaces comprises a reflective element 870 extending along the length thereof to the second end 890 of the waveguide. The second surface 820 further comprises a second transmissive-reflective element 860 adjacent the first end 880 of the waveguide forming an input port or entrance aperture.

FIG. 8 shows two pairs of example light rays. In particular, a first pair of example light rays comprises a first example ray 803 at first angle—indicated by dotted line—and a second example ray at a second angle—indicated by solid line. A second pair of example light rays comprises a third example ray 804 at a third angle—indicated by dashed line—and a fourth example ray at a fourth angle—indicated by solid line.

In accordance with the embodiment of FIG. 8, second transmissive-reflective element 860 comprises a surface that is partially transmissive and partially reflective of light. In some examples, second transmissive-reflective element 860 comprises a surface with uniform transmissivity/reflectivity. An example comprising a uniform second transmissive-reflective element 860 is described below with reference to FIG. 11. In other examples, second transmissive-reflective element 860 comprises a surface with a graded transmissivity in a direction from the first end 880 to the second end 890 of the waveguide. For example, a graded facet (e.g. coating with graded surface transmissivity/reflectivity) may be formed that spans across at least part of the entrance aperture. An example comprising a graded second transmissive-reflective element 860 is described below with reference to FIG. 12.

Accordingly, light incident on the entrance aperture is partially transmitted and partially reflected by second transmissive-reflective element 860. Thus, a proportion light incident on the entrance aperture is transmitted by the second transmissive-reflective element 860, and so coupled into the waveguide as shown by arrows. At the same time, the remaining proportion of the light incident on the entrance aperture is reflected by the second transmissive-reflective element 860, and so not coupled into the waveguide—these reflected light rays are omitted from FIG. 8 for ease of illustration.

Thus, some light rays of the bundle of rays of the light beam, such as the second pair of example light rays including third example ray 804—indicated by dashed line—at the front edge of the beam (i.e. furthest from the first end 880 of the waveguide or furthest to the right in the drawing), are coupled into the waveguide in the same way as the second and third example light rays of FIG. 7, as shown by arrows. In particular, these rays are incident on the second transmissive-element 860 only once. However, some of the light rays may be incident on the entrance aperture twice. For example, the first pair of example light rays including first example ray 803—indicated by dotted line—at the rear edges of the beam (i.e. closest to the first end 880 of the waveguide or furthest to the left in the drawing) may be incident on the entrance aperture and reflected or "bounce" back to a position at the entrance aperture of the second surface 820. This is equivalent to first example ray 703—indicated by dotted line—of FIG. 7 that is lost. However, in accordance with this embodiment, these rays are partially internally reflected within the waveguide as well as partially transmitted out of the waveguide (not shown for ease of illustration) by second transmissive-reflective element 860. Moreover, due to the expansion of the entrance aperture towards the second end 890 of the waveguide, some light rays at the front edges of the bundle of light rays of the beam (such as the second pair of example light rays comprising third example ray 804—indicated by dashed line) are incident on the entrance aperture. This is in contrast to the third example ray 704—indicated by dashed line—of FIG. 7 that is lost. Thus, a proportion of the intensity of all these light rays is fully coupled into the waveguide by second transmissive-reflective element, as shown by arrows.

Advantageously, since a proportion of this light is coupled into the waveguide, there is no loss of the image content associated with these light ray angles. Thus, coupling of light rays is improved.

The proportion of light coupled into/out of the waveguide at the entrance aperture is dependent upon the relative transmissivity/reflectivity of the second transmissive-reflective element 860. In addition, the size of the bundle of rays forming the input beam impacts the energy efficiency of the waveguide. For example, if the second transmissive-reflective element is uniformly partially transmissive/reflective, then the optical efficiency for some of the rays may be reduced. For example, if the second transmissive-reflective element 860 is uniformly 50% transmissive and 50% reflective (i.e. 50% R, 50% T) along the length of the entrance aperture, then the energy loss may be 75% (such as the first example light ray 803—indicated by dotted line). Thus, the relative transmissivity/reflectivity of the second transmissive-reflective element 860 along the length of the entrance aperture may be optimised according to application requirements including the size of the ray bundle. This may be achieved by the selection of one or more coatings formed on the second surface 820 of the waveguide.

Figure 9:
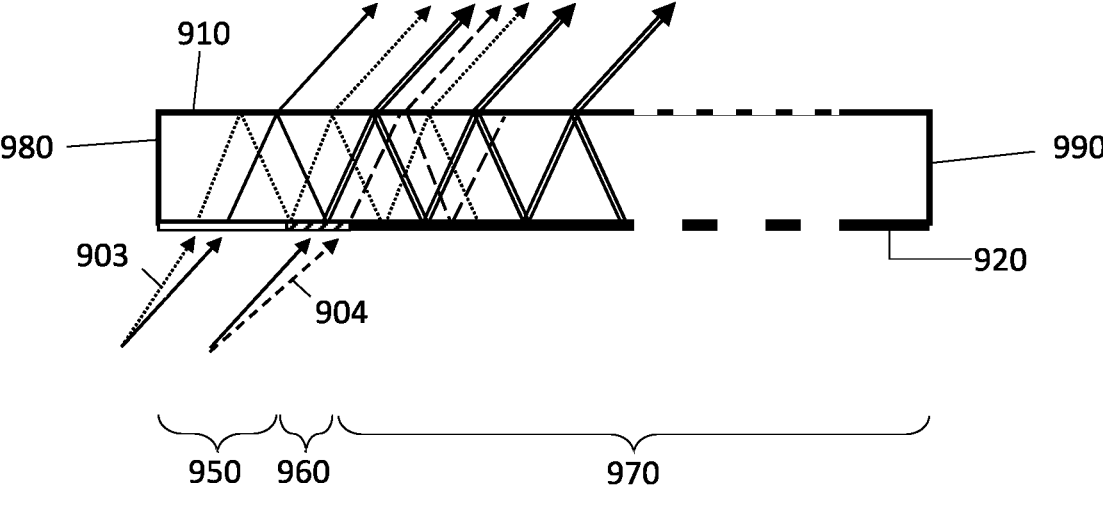
FIG. 9 shows the coupling of light rays of a diffracted light field into a waveguide comprising an input port in accordance with a second embodiment of the present disclosure.

FIG. 9 is a schematic ray diagram, showing the coupling of a divergent beam of light into waveguide having an input port (or "entrance aperture") comprising a transmissive-reflective element in accordance with a second embodiment. In this arrangement, the light beam is incident on the input port in a similar configuration to the light beam of the embodiment of FIG. 8, and the input port is extended in the same way as the embodiment of FIG. 8.

As in the embodiment of FIG. 8, the waveguide of FIG. 9 comprises a pair of opposing surfaces 910, 920 arranged to guide light therebetween in a direction along its length from a first end 980 to a second end 990, as shown by the light rays. In particular, the light rays undergo a series of internal reflections or "bounces" between the pair of opposing surfaces 910, 920. A first surface 910 of the pair of opposing surfaces comprises a first transmissive-reflective element that forms an output port of the waveguide. As shown by arrows, a series of replicas is formed and transmitted through the output port, as described above with reference to FIG. 6. A second surface 920 of the pair of opposing surfaces comprises a reflective element 970 extending along the length thereof to the second end 990 of the waveguide. The second surface 920 further comprises a second transmissive-reflective element 960 adjacent the first end 980 of the waveguide forming an input port or entrance aperture.

FIG. 9 shows two pairs of example light rays. In particular, a first pair of example light rays comprises a first example ray 903 at first angle—indicated by dotted line—and a second example ray at a second angle—indicated by solid line. A second pair of example light rays comprises a third example ray 904 at a third angle—indicated by dashed line—and a fourth example ray at a fourth angle—indicated by solid line.

In an example, the entrance aperture comprises a partially transmissive/reflective element (e.g. uniformly 50% R, 50% T) 960 that extends over only a part of the length of the entrance aperture adjacent the reflective element 970 of the second surface 920 of the waveguide. The entrance aperture additionally comprises a (highly) transmissive element 950 that extends over the remaining part of the entrance aperture adjacent the first end 980 of the waveguide. Some of the rays of the bundle of light rays of the light beam, which are incident on the transmissive element 950 of the entrance aperture, are transmitted through the entrance aperture, as shown by the arrows (e.g. first pair of example light rays including first example ray 903—indicated by dotted line). These rays are incident on the entrance aperture twice, since they are internally reflected in a "bounce" by first surface 910 of the waveguide and are incident on the partially transmissive/reflective element 960 of the entrance aperture at the second surface 920. The second transmissive/reflective element 960 of the entrance aperture transmits a proportion (e.g. 50%) of the intensity of these light rays out of the waveguide (not shown for ease of illustration) whilst reflecting the remaining proportion (e.g. 50%) of the intensity of these light rays into the waveguide, as shown by arrows. Conversely, only a proportion (e.g. 50%) of the intensity of some other rays of the bundle of light rays of the light beam, which are incident on the partially transmissive/reflective region 960 of the entrance aperture, are transmitted into the waveguide, whilst the remaining proportion (e.g. 50%) is reflected and does not enter the waveguide (not shown for ease of illustration). These rays are incident on the entrance aperture only once, and are internally reflected in a "bounce" by first surface 910 and are incident on the reflective element 970 of second surface 920, and thus are fully coupled into the waveguide.

In embodiments, the length of the partially transmissive/reflective element 960 of the entrance aperture is configured so that light of all incident rays passes through this region once only. In consequence, all incident rays are fully coupled into, and guided within, the waveguide with substantially the same optical efficiency—in this example, with 50% efficiency. This results in consistent pupil expansion of all the light rays and thus all the image content. The person skilled in the field of optics will appreciate that this is a simple matter of geometry.

In the embodiments shown in FIGS. 8 and 9, each of the first and second pairs of example light rays is shown having a respective light ray angle originating from a common position, which may correspond to a pixel of a display device external to the waveguide. Nevertheless, the advantages of improved coupling of light rays, by virtue of arrangements of the entrance aperture according to the present disclosure, may be achieved irrespective of the point of divergence of the light rays. For example, if divergence of the input beam occurs downstream of the entrance aperture, then light rays at light ray angles that are incident on the entrance aperture twice, which would otherwise be lost through a transparent entrance aperture, may be properly coupled into the waveguide.

Figure 10:
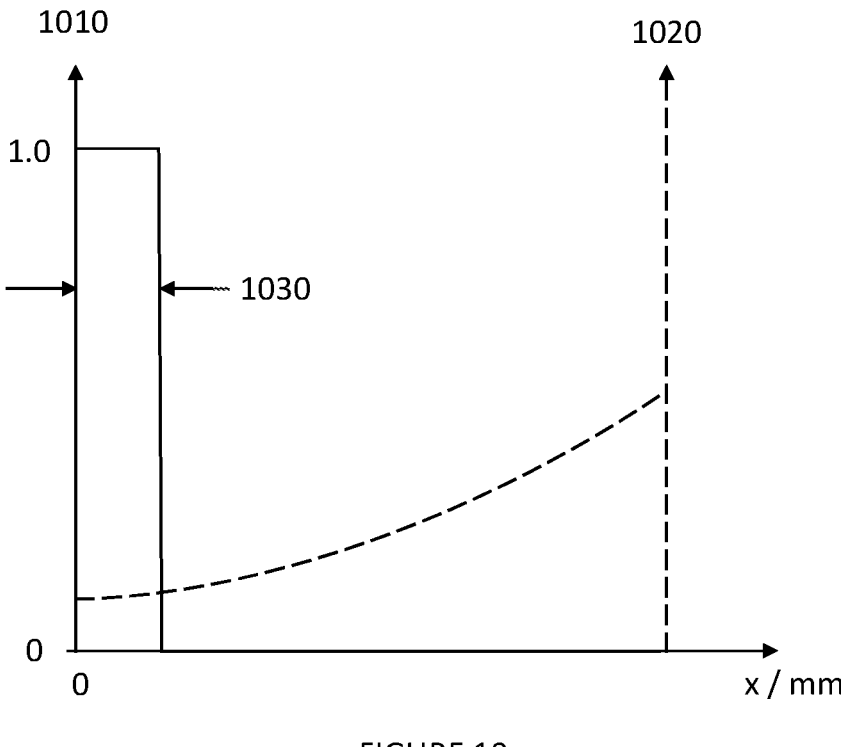
FIG. 10 is a graph showing ideal surface transmission with distance of an entrance surface and an exit surface of a waveguide having an input port comprising a transparent window.

FIG. 10 is a graph showing the variation of light transmission with distance of the opposing first and second surfaces of the (conventional) waveguide of FIG. 6. In particular, the x axis represents the distance from the first end 680 of the waveguide to the second end 690 of the waveguide. The first y axis 1010 (on the left-hand side) and associated line plot (shown as a solid line) represents the light transmission at the second opposing surface 620 forming the entrance surface (i.e. input port), and the second y axis 1020 (on the right-hand side) and associated line plot (shown as a dashed line) represents the light transmission values at the first opposing surface 610 forming the exit surface (i.e. including the output port). As shown in FIG. 10, the first opposing surface 610 has a light transmission value that increases with distance from the first end 680 to the second end 690 of the waveguide. This increase in transmissivity with distance from the first end 680 at the output port formed by first surface 610, compensates for the division of light (some reflected/some transmitted) at each "bounce" along the length of the waveguide—so that the replicas are formed with substantially the same light intensity and are thus perceived as having the same brightness within the eye-box. A desired change in transmissivity with distance of the second surface 610 may be achieved by a selecting a suitable graded surface coating, as well known to the skilled person. The second opposing surface 620 has a light transmission of 1 (i.e. 100%) at the first end 680 of the waveguide and extending for a distance 1030. Distance 1030 corresponds to the width of the transmission window forming the input port of the waveguide. Herein, the "width" of the transmission window/entrance aperture/input port is measured along the "length" of the waveguide (e.g. from the first end 680 to the second end 690 of the waveguide of FIG. 6). In addition, the second opposing surface 620 has a light transmission value of substantially 0 (preferably <0.05) extending from distance 1030 up to the second end 690 of the waveguide, which corresponds to the length of the reflective element 640.

Figure 11:
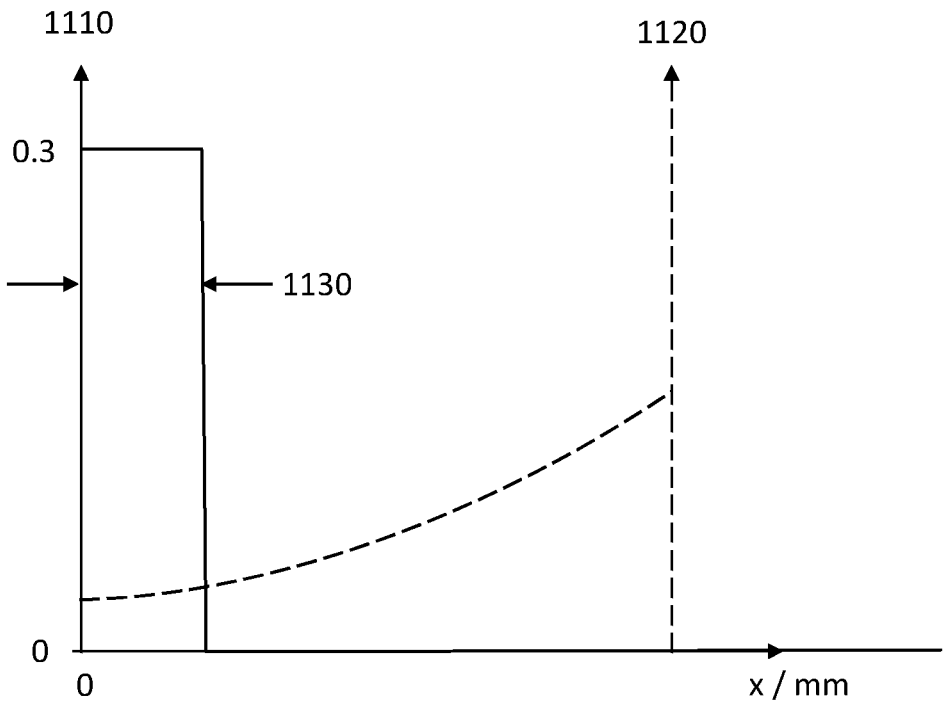
FIG. 11 is a graph showing surface transmission with distance of an entrance surface and an exit surface of a waveguide having an input port comprising a uniformly partially transmissive-reflective element in accordance with embodiments.

FIG. 11 is a graph showing the variation of light transmission with distance for one example of the first embodiment of FIG. 8, similar to FIG. 10, in which the second transmissive-reflective element 860 comprises a surface with uniform transmissivity/reflectivity. Thus, the x axis represents the distance from the first end 880 of the waveguide to the second end 890 of the waveguide. First y axis 1110 (on the left-hand side) and associated line plot (shown as a solid line) represents the light transmission at the second opposing surface 820 forming the entrance surface (i.e. including the input port), and the second y axis 1120 (on the right-hand side) and associated line plot (shown as a dashed line) represents the light transmission at the first opposing surface 810 forming the exit surface (i.e. including the output port). In the embodiment of FIG. 8, the first opposing surface 810, comprising the first transmissive-reflective element, has the same variation of light transmission with distance as the conventional waveguide of FIG. 6. Thus, the second y axis 1120 and associated line (shown as a dashed line) is the same as in FIG. 10. However, as shown in FIG. 11, the second opposing surface 820 has a light transmission value of 0.3 (i.e. 30%—other examples may have any transmission value in the range of about 0.1 to about 0.5, such as 0.2 to 0.4) at the first end 880 of the waveguide and extending for a distance 1130. Distance 1130 corresponds to the width of the entrance aperture/second transmissive-reflective element 860 of FIG. 8, which is extended to be slightly longer that the width of the transmission window 1030 of FIG. 6. In addition, the second opposing surface 820 has a light transmission value of substantially 0 (preferably <0.05) extending from distance 1130 up to the second end 890 of the waveguide, which corresponds to the length of the reflective element 640. As the skilled person will appreciate, in embodiments, the transmissivity of the (highly) reflective element is less than 0.1, such as less than 0.07 or less than 0.05.

Figure 12:
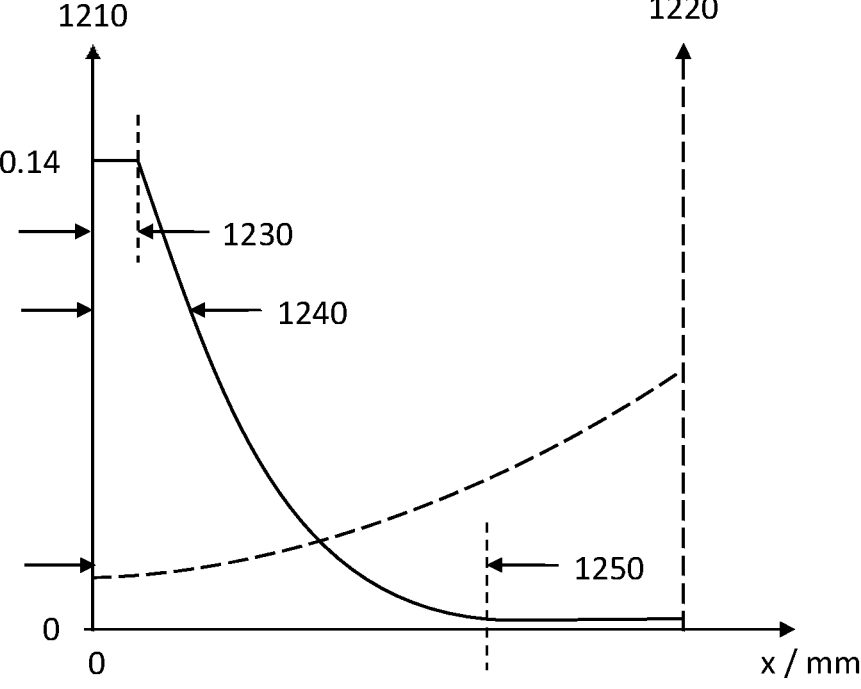
FIG. 12 is a graph showing surface transmission with distance of an entrance surface and an exit surface of a waveguide having an input port comprising a graded partially transmissive-reflective element in accordance with other embodiments.

FIG. 12 is a graph showing the variation of light transmission with distance for another example of the embodiment of FIG. 8, similar to FIGS. 10 and 11. In this example, the second (partially) transmissive-reflective element 860 of the entrance aperture has a graded reflectivity along a part of the width thereof. Thus, the x axis represents the distance from the first end 880 of the waveguide to the second end 890 of the waveguide. First y axis 1210 (on the left-hand side) and associated line plot (shown as a solid line) represents the light transmission at the second opposing surface 820 forming the entrance surface (i.e. including the input port), and the second y axis 1220 (on the right-hand side) and associated line plot (shown as a dashed line) represents the light transmission at the first opposing surface 810 forming the exit surface (i.e. including the output port). In this embodiment, the first opposing surface 810, comprising the first transmissive-reflective element, has the same variation of light transmission with distance as the waveguide of FIGS. 6 and 8. Thus, the second y axis 1220 and associated line plot (shown as a dashed line) is the same as in FIGS. 10 and 11. However, as shown in FIG. 12, the second opposing surface 820 has a light transmission value of 0.14 (i.e. 14%—other examples may have any transmission value in the range of about 0.1 to about 0.3) at the first end 880 of the waveguide and extending for a distance 1230. Distance 1230 corresponds to the width of a first region of second transmissive-reflective element 860 of the entrance aperture (the full width of the entrance aperture extends to distance 1240). The second transmissive-reflective element 860 has uniform partial transmissivity/reflectivity (i.e. 86% R; 14% T). In addition, the second opposing surface 820 has a light transmission that varies, in particular continuously decreases, with distance towards the second end 890 of the waveguide from distance 1230. This variable transmissivity/reflectivity illustrated in the line plot associated with the first y axis 1210 (shown as a solid line) corresponds to a graded second region of the second transmissive-reflective element 860, which extends from the first, uniformly transmissive/reflective region at distance 1230 to a point at the boundary of the entrance aperture and the reflective element 870 of the second opposing surface 820 at distance 1240. In addition, the variable transmissivity/reflectivity illustrated in the line plot associated with the first y axis 1210 (shown as a solid line) also corresponds to a region of the reflective element 870. In particular, in contrast to embodiments in which the reflective element on the second opposing surface is uniformly (highly) reflective, reflective element 870 is graded continuously with the second region of the partially transmissive/reflective element 860 along the length of the second opposing surface 220 until the light transmission value is substantially 0 (preferably <0.05) at distance 1250. The light transmission value of reflective element 870 is then substantially 0 from point 1250 up to the second end 890 of the waveguide. Accordingly, the second opposing surface 820 comprises a (continuously) graded partially transmissive/reflective layer forming a part of the entrance aperture/second transmissive/reflective element 860 and a part of the reflective element 870. This advantageously avoids any sharp discontinuities in the intensity of the in-coupled light, which can improve image quality.

In the example of the first embodiment shown in FIG. 12, the second transmissive-reflective element 860 has graded transmissivity/reflectivity along only a part of the width thereof. As the skilled person will appreciate, in other examples, the whole of the width of the second transmissive-reflective element 860 may be graded, such that the whole of the second surface 820 (e.g. from a first end 880 up to distance 1250 in FIG. 12) may be continuously graded.

Accordingly, embodiments of the waveguide disclosed herein have optimised light ray coupling efficiency, such that all light rays of a bundle of light rays of an input light beam (e.g. a divergent beam) are fully coupled into the waveguide, and, thus, guided from the input port to the output port. This prevents any gaps, which may appear as dark bands, in the image perceived by a viewer at all positions within the eye-box. In addition, there is improved tolerance of waveguide angle during alignment of the waveguide input port with the optical/projection axis in the display/projection system. The advantages arise in a holographic display device without any need to modify the diffracted light field/hologram encoded within the light beam, and thus without any changes to the method of producing the diffracted light field.

ADDITIONAL FEATURES

In embodiments, the holographic reconstruction is colour. In some embodiments, an approach known as spatially-separated colours, "SSC", is used to provide colour holographic reconstruction. In other embodiments, an approach known as frame sequential colour, "FSC", is used.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some arrangements describe 2D holographic reconstructions by way of example only. In other arrangements, the holographic reconstruction is a 3D holographic reconstruction. That is, in some arrangements, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A waveguide comprising:

a pair of opposing surfaces arranged to guide a light field therebetween by internal reflection;

an input port arranged to receive light from a display system, wherein the input port comprises a first transmissive-reflective element disposed on a first surface of the pair of opposing surfaces and configured to (i) receive, and partially transmit and partially reflect, at least a portion of the light from the display system and (ii) internally reflect within the waveguide at least some of the light field;

a reflective element disposed on the first surface of the pair of opposing surfaces, wherein the reflective element is adjacent to the first transmissive-reflective element and configured to internally reflect the light field within the waveguide, and wherein a transmissivity of the first surface from a start of the first transmissive-reflective element to an end of the reflective element is one of (i) continuous or (ii) continuously decreasing; and an output port formed by a second transmissive-reflective element disposed on a second surface of the pair of opposing surfaces, wherein the second transmissive-reflective element is such that the light field is divided at each internal reflection and a plurality of replicas of the light field are transmitted out of the waveguide through the output port.

2. The waveguide of claim 1, wherein the first transmissive-reflective element is at least one of (i) configured such that at least some of the light field is incident thereon only once or (ii) configured such that all light rays of the light field are incident thereon only once.

3. The waveguide of claim 1, wherein the input port is formed on the first surface of the pair of opposing surfaces.

4. The waveguide of claim 1, wherein the first transmissive-reflective element has a transmissivity of between 0.1 to 0.5.

5. The waveguide of claim 1, wherein the reflective element is disposed on the first surface immediately adjacent to the input port.

6. The waveguide of claim 1, wherein a transmissivity of the reflective element is one of (i) less than 0.1, (ii) less than 0.07, or (iii) less than 0.05.

7. The waveguide of claim 1, wherein the first transmissive-reflective element is arranged to receive all the light from the display system.

8. The waveguide of claim 1, wherein the input port further comprises a transmissive element arranged to receive a portion of the light from the display system, and wherein one of (i) the transmissive element adjoins the first transmissive-reflective element and (ii) the first transmissive-reflective element adjoins the reflective element.

9. The waveguide of claim 1, wherein the first transmissive-reflective element comprises a partially transmissive and partially reflective surface coating.

10. The waveguide of claim 1, wherein the input port has a length in a direction of waveguiding and the first transmissive-reflective element extends over at least a part of the length of the input port.

11. The waveguide of claim 1, wherein one or both of (i) the display system comprises a spatial light modulator arranged to display a hologram and (ii) the light field is spatially modulated in accordance with the hologram.

12. The waveguide of claim 1, wherein the display system comprises a display device having a pixel area defining an exit pupil of the display system that is expanded by the waveguide.

13. A system comprising a waveguide, wherein the waveguide comprises:

a pair of opposing surfaces arranged to guide a light field therebetween by internal reflection;

an input port arranged to receive light from a display system, wherein the input port comprises a first transmissive-reflective element disposed on a first surface of the pair of opposing surfaces and configured to (i) receive, and partially transmit and partially reflect, at least a portion of the light from the display system and (ii) internally reflect within the waveguide at least some of the light field;

a reflective element disposed on the first surface of the pair of opposing surfaces, wherein the reflective element is adjacent to the first transmissive-reflective element and configured to internally reflect the light field within the waveguide, and wherein a transmissivity of the first surface from a start of the first transmissive-reflective element to an end of the reflective element is one of (i) continuous or (ii) continuously decreasing; and an output port formed by a second transmissive-reflective element disposed on a second surface of the pair of opposing surfaces, wherein the second transmissive-reflective element is such that the light field is divided at each internal reflection and a plurality of replicas of the light field are transmitted out of the waveguide through the output port; and wherein the waveguide is a second one-dimensional pupil expander of a pair of waveguide pupil expanders arranged to expand a pupil of the display system in a first direction and a second, perpendicular direction, respectively.

14. A system comprising:

a display system arranged to form a light field for viewing by a viewing system; and a waveguide configured to receive the light field at an input port thereof, wherein the light field increases in size with propagation distance from the display system such that the viewing system can perceive a virtual image at a finite virtual image distance, and wherein the waveguide comprises:

a pair of opposing surfaces arranged to guide a light field therebetween by internal reflection;

an input port arranged to receive light from a display system, wherein the input port comprises a first transmissive-reflective element disposed on a first surface of the pair of opposing surfaces and configured to (i) receive, and partially transmit and partially reflect, at least a portion of the light from the display system and (ii) internally reflect within the waveguide at least some of the light field;

a reflective element disposed on the first surface of the pair of opposing surfaces, wherein the reflective element is adjacent to the first transmissive-reflective element and configured to internally reflect the light field within the waveguide, and wherein a transmissivity of the first surface from a start of the first transmissive-reflective element to an end of the reflective element is one of (i) continuous or (ii) continuously decreasing; and an output port formed by a second transmissive-reflective element disposed on a second surface of the pair of opposing surfaces, wherein the second transmissive-reflective element is such that the light field is divided at each internal reflection and a plurality of replicas of the light field are transmitted out of the waveguide through the output port.

15. The waveguide of claim 1, wherein the light field comprises a diffracted light field.

16. The waveguide of claim 1, wherein the light field comprises an image formed by holographic reconstruction.

17. The system of claim 13, wherein the light field comprises a diffracted light field.

18. The system of claim 13, wherein the light field comprises an image formed by holographic reconstruction.

19. The system of claim 14, wherein the light field comprises a diffracted light field.

20. The system of claim 14, wherein the light field comprises an image formed by holographic reconstruction.

* * * * *